Feb. 1, 1949.  D. D. LOWBER ET AL  2,460,515
CALIBRATED RETARDATION PLATE FOR MEASURING
BIREFRINGENCE AND METHOD OF MAKING SAME
Filed April 23, 1946  2 Sheets-Sheet 1

INVENTORS
DAVID D. LOWBER
JOSEPH D. REARDON
BY PHILIP W. COLLYER
ATTORNEY

Feb. 1, 1949.  D. D. LOWBER ET AL  2,460,515
CALIBRATED RETARDATION PLATE FOR MEASURING
BIREFRINGENCE AND METHOD OF MAKING SAME
Filed April 23, 1946  2 Sheets-Sheet 2
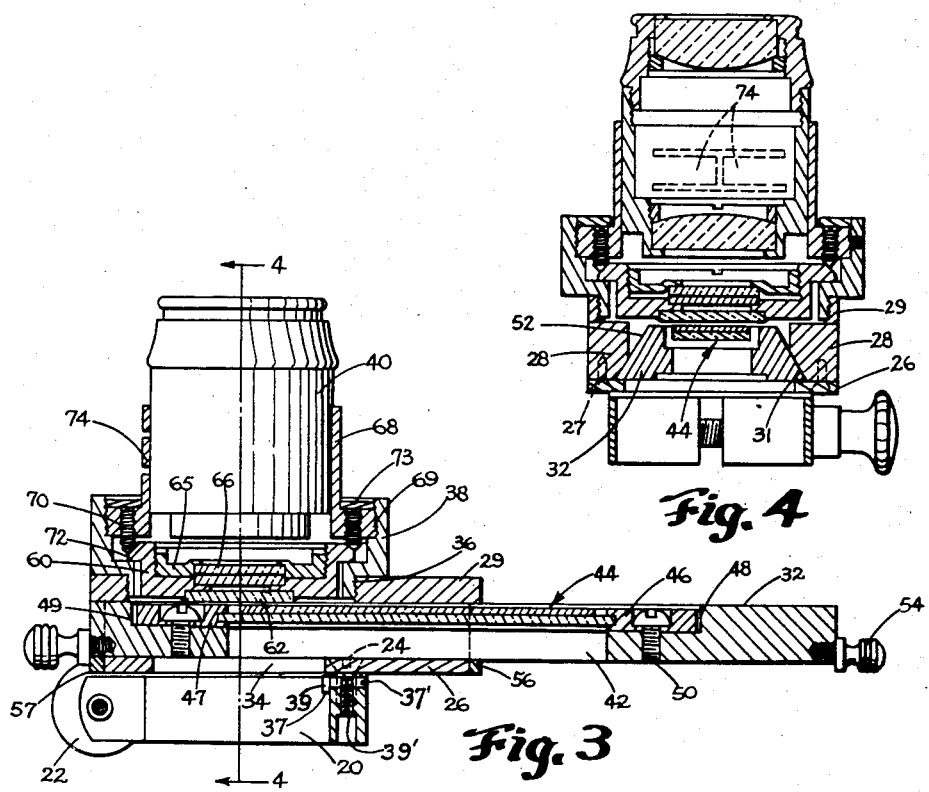
Fig. 4
Fig. 3
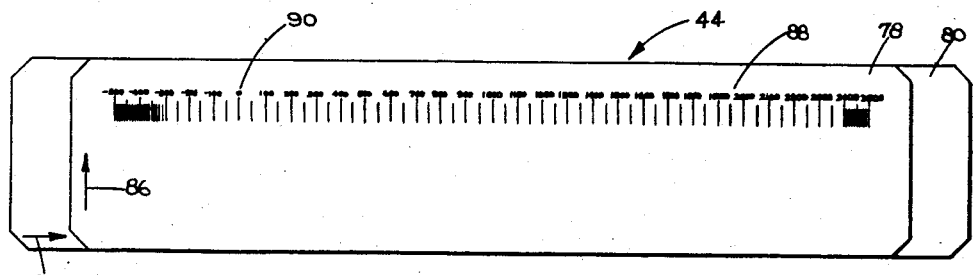
Fig. 5
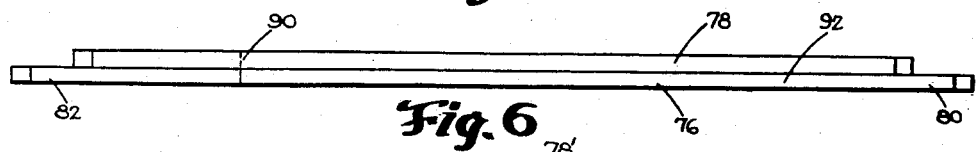
Fig. 6
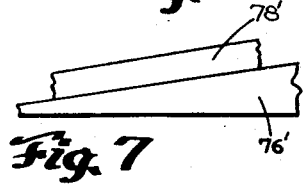
Fig. 7
INVENTORS
DAVID D. LOWBER
BY JOSEPH D. REARDON
PHILIP W. COLLYER
ATTORNEY Patented Feb. 1, 1949

2,460,515

UNITED STATES PATENT OFFICE 2,460,515

CALIBRATED RETARDATION PLATE FOR MEASURING BIREFRINGENCE AND METHOD OF MAKING SAME

David D. Lowber, Snyder, and Joseph D. Reardon and Philip W. Collyer, Buffalo, N. Y., assignors to American Optical Company, Southbridge, Mass., a voluntary association of Massachusetts Application April 23, 1946, Serial No. 664,392

4 Claims. (Cl. 88—65)

This invention relates to optical devices and more particularly to new and improved birefringent retardation plates, wedges and the like employed with optical instruments, such as petrographic and polarizing microscopes, for the study and measurement of certain physical properties of specimens or samples of isotropic and anisotropic materials. The invention also relates to a method of manufacture of such retardation plates, wedges and the like.

Heretofore, retardation plates have been made from various known birefringent materials, such as quartz, and in order to function in the manner desired have been made as relatively long, thin tapered plate-like members and provided with scales for indicating the amount of birefringence produced by the various thicknesses of such plate-like members. Since the amount of birefringence at any particular section of such a tapered member is directly proportional to the thickness at such section, it was necessary, in order to provide values approaching zero, that such a member be tapered to an exceedingly thin sharp edge. In fact, such members were too thin to be practical. Furthermore they would not accurately indicate zero birefringence, nor both positive and negative values of birefringence. Also it was found difficult to provide such members with clear, sharply defined, accurately calibrated durable scales which were correctly located on the members to thus afford the high degree of accuracy desired.

Applicant's invention comprises a new method of making birefringent retardation plate-like members in such a manner as to overcome the above objections and in accurately locating and calibrating a scale thereon, and likewise comprises the new and improved plate-like retardation devices resulting from such method.

It is, accordingly, an object of the present invention to provide a plate-like member having progressively varying bifringent retardation properties along the length thereof and ranging from zero to relatively large values thereof and having a scale accurately positioned to indicate such values. The invention also includes the method of producing such an accurately calibrated member.

It is another object of the invention to provide a plate-like member of the character described having positive, negative and zero birefringent retardation properties and a graduated scale associated therewith including a base reference mark accurately positioned upon the member for indicating the magnitudes of the birefringence of specimens under examination as well as the sign of such bifringence. The invention also includes the method of making such a retardation plate.

It is a further object of the invention to provide a plate-like device formed of a plane parallel member and a wedge shaped member cemented or secured together and having birefringent retardation properties and a graduated scale associated therewith for indicating positive, negative and zero bifringerant values of said device, such scale being accurately located relative to the transverse plane of zero birefringence and so graduated as to give accurate indications of the amounts of positive and negative birefringence in the sample being inspected. The invention further includes the method of producing such a plate-like device.

Other objects and advantages of the invention will become apparent from the following description taken in conjunction with the accompanying drawings. It will be understood that changes may be made in the details of construction, arrangement of parts and the steps of the method employed without departing from the spirit of the invention as expressed by the accompanying claims. We, therefore, do not wish to be limited to the exact details of construction, arrangement of parts and steps of the process shown and described as the preferred form has been given by way of illustration only.

Referring to the drawings:

Fig. 3 is a vertical sectional view taken substantially on line 3—3 of Fig. 1 and looking in the direction of the arrows;

Fig. 4 is a sectional view taken substantially on line 4—4 of Fig. 3 and looking in the direction of the arrows;

Fig. 5 is an enlarged plan view of superimposed birefringent retardation plate-like members employed in the slide of Fig. 3;

Fig. 6 is an elevational view of the plate-like members of Fig. 5;

Fig. 7 is a diagrammatic showing of a portion of the plate-like members of Figs. 5 and 6, but greatly distorted in shape in order to more clearly describe the invention;

Figure 1:
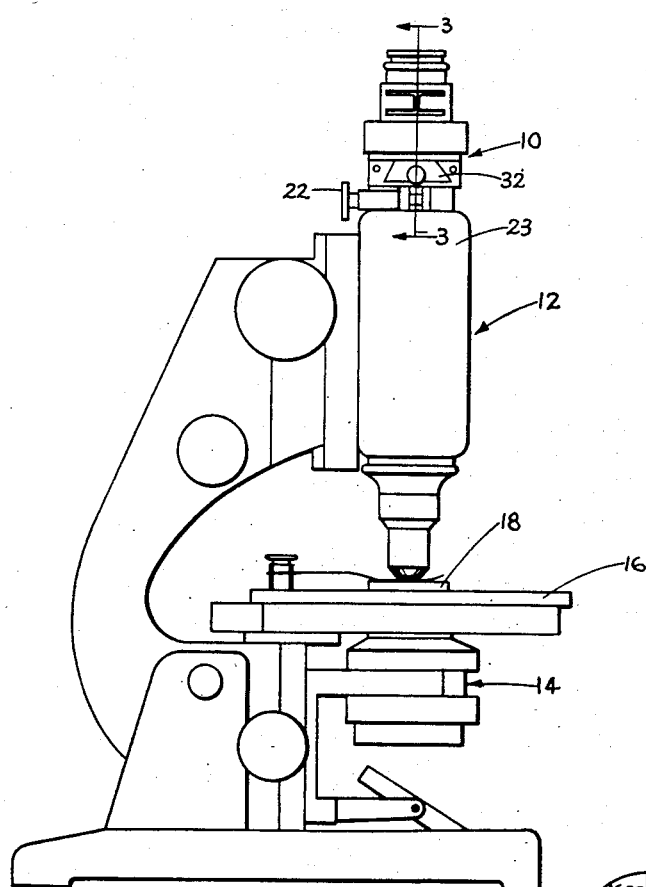
Fig. 1 is a side elevational view of a polarizing microscope and retardation plate attachment embodying the invention.

Referring to the drawings in detail, numeral 10 indicates generally an optical device or attachment arranged to be secured to the upper end of a conventional polarizing microscope 12 and adapted to function in conjunction with a polarizer and condenser 14 positioned beneath a rotatable stage 16 so that the birefringent properties of specimens or the like, such as minute crystals of material upon a slide 18, may be studied and measured thereby. The attachment 10, as is clearly shown by Figs. 2 and 3, comprises a split ring portion 20 which may be clamped by a thumb screw 22 about an upstanding flange (not shown) upon the upper end of the microscope tube 23 and to this ring 20 is secured, as by screws 24, a lower guide plate 26. This plate is in turn secured by screws 27 to a pair of spaced guide rails 28 and an upper plate 29 is secured to the guide rails by screws 30. The plate 29 and guide rails 28 are adapted to form with the plate 26 guideways for the lower lateral corners 31 of a slide 32. The lower plate 26 is provided with an opening 34 and the upper plate 28 is provided with a threaded opening 36 concentrically arranged relative to the optical axis of the microscope 12 so that a removable collar 38 may be threaded into the opening 36 and serve to support an eyepiece 40 and associated structure in optical alignment with objective of the microscope as will be hereinafter more fully described. An adjustable pin 37 is provided with an eccentric head 39 and a slot 37' so that it may be rotated for proper engagement with a suitable notch in said upstanding microscope flange and maintains the attachment 10 in a predetermined angular relation relative thereto. A set screw 39' locks pin 37 against rotation.

Figure 2:
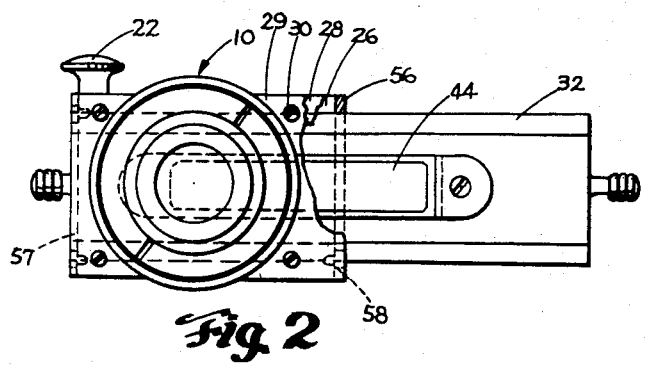
Fig. 2 is a plan view of the attachment of Fig. 1, a part thereof being broken away to more clearly show a slide and the retardation plate therein.

The slide 32 is of generally rectangular shape, as shown by Fig. 2, and is elongated so that an aperture 42 may be formed therein for accommodating a graduated retardation plate 44 which has its opposite ends fitted into grooves in supporting blocks 46 and 47 (see Fig. 3) arranged in recesses 48 and 49 in said slide adjacent the opposite ends of the aperture 42. These blocks are removably held in place by screws or the like 50. The opposite lateral edges of the slide 32 are bevelled as indicated at 52 to form the lower corner portions 31 previously referred to and these corners guide the slide as it is moved rectilinearly and normally to the optical axis of the microscope. Thus the slide may be moved for selectively positioning various portions of the retardation plate 44 in optical alignment with the optical system of the microscope. Handles 54 are provided at opposite ends of the slide for moving the slide in either direction. Removable covers 56 and 57 are secured by screws 58 at opposite ends of the guide rails 28 and serve to fit closely about the slide 32 and thus enclose the guideway therefor.

Figure 9:
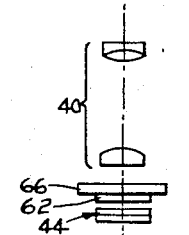
Fig. 9 is a plan view of the reticule of the instrument and a graduated scale on said plate-like members as viewed through the eyepiece of the instrument of Fig. 1.
Figure 8:
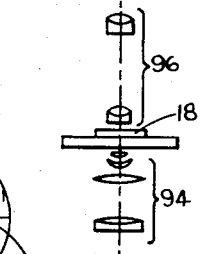
Fig. 8 is a conventional optical system which may be employed in the structure of Fig. 1.

Positioned within the removable collar 38 is a centerable cell 60 which serves to support a transparent plate 62 having a reticule 64 comprising cross hairs 64a and 64b (see Fig. 9) formed preferably upon its lower surface. Threaded into this cell 60 is a retaining ring 65 adapted to enclose an analyzer 66 between an upper flange thereof and a flange formed on the cell 60 intermediate said analyzer and the transparent plate 62. An eyepiece supporting and guiding member 68 is provided with a flange 69 threaded into the upper end of the collar 38 and a plurality of centering screws 70 extend through this flange. These screws are arranged to have their sloping inner ends engaged with a bevelled rim portion 72 of the cell 60 so that adjustment of these screws as desired may be utilized to properly center and retain the reticule in place relative to the optical system of the eyepiece 40. An enclosing ring 73 is thereafter threaded into the upper end of the collar 38 and this prevents anyone from disturbing the adjustment of these screws. The tubular guide 68 is provided with a cylindrical inner surface to slidably receive the eyepiece 40 and spring fingers 74 are formed in said tubular guide to provide friction means for maintaining the eyepiece in any desired adjusted position during use of the device. The eyepiece may be of conventional construction so long as it is adapted to focus substantially at the plane of the reticule 64.

The retardation plate or device 44 is formed by a lower plate-like member 76 and an upper plate-like member 78 formed of material having birefringent retardation properties. A preferred material for these members is quartz. As may be clearly seen from Figs. 5 and 6, members 76 and 78 are of relatively thin elongated platelike form. The lower member 76 is accurately formed with optically flat upper and lower surfaces which are disposed in the shape of a relatively thin wedge having its thicker end 80 located at the right and its thinner end 82 located at the left as viewed in Fig. 6. The plate-like member 78, on the other hand, is accurately formed with optically flat upper and lower parallel surfaces. In order to more clearly emphasize the relative shapes of these two members, an exaggerated condition thereof is digrammatically indicated by Fig. 7 and it will be readily seen therefrom that while the lower member indicated by numeral 76' is wedge shaped, as viewed from a side thereof, the upper member indicated by 78' is provided with upper and lower parallel surfaces.

The member 76 is cut from quartz in such a manner that the optical axis of the crystal extends in a direction parallel to the longitudinal dimension of the plate 76, as indicated by the arrow 84, while the member 78 is cut from quartz in such a manner that the optical axis of the crystal extends in the transverse direction of plate 78, as indicated by the number 86. Since the amount of birefringence introduced into a beam of light by a plate-like member normal to said beam is directly proportional to the thickness of the plate-like member, it would be possible to employ merely a single elongated wedge for introducing various amounts of birefringence, if it were practical to have such a wedge taper down to an extremely thin sharp edge. However, in dealing with quartz and like materials such is highly impractical. Even if such a wedge were feasible only positive or only negative birefringent readings could be obtained thereby, depending upon the particular position of wedge relative to the position of the polarizer. Applicants' arrangement, however, provides two plate-like birefringent members with their optical axis at right angles to each other so as to produce a resultant birefringence in a beam of light passing therethrough equal to the difference of their combined thickness. The plate-like member 78 having parallel upper and lower surfaces and the plate-like member 76 being in the form of a relatively thin elongated wedge are arranged in superimposed relation and are of such proportions that said wedge 76 has a transversed section intermediate its ends having a thickness which is the same as the thickness of the plate-like member 78. The resultant birefringence at such intermediate transverse plane will equal zero. The difference in thicknesses in the members 76 and 78 at any location to the right side of this plane will thus produce a positive birefringence while the difference in thicknesses at any location therein at the opposite side of said transverse plane will produce a negative birefringence.

It is desirous to provide for such a combined retardation plate 44 an accurately calibrated scale for indicating the various amounts of positive and negative birefringence produced by the retardation plate. It is also desirable to accurately locate such a scale upon the retardation plate with the zero or base reference mark of the scale accurately located in the transverse plate of zero birefringence of such a retardation plate, and with the positive and negative values on the scale positioned to properly indicate positive and negative values of birefringence provided by the corresponding portions of said retardation plate. Applicants have found that extremely accurate calibrations may be provided for their retardation plate 44 and accurately positioned thereon in the following manner. Since the wedge shaped member 76 may have its opposite ends accurately measured for birefringent properties, and such depends upon the thicknesses thereof, they may determine the correct size of scale which may be easily calculated and used therewith. This scale is added to the plane parallel plate 78. Since quartz and like birefringent retardation materials employed for such purposes are not easily engraved or etched to give clear markings and numbers for such small sizes as are desirable for the scale to be used on applicants' retardation plate, other means or methods of marking are desirable and excellent results may be obtained by coating that portion of the upper surface of member 78 upon which the scale is to ultimately appear with a semitransparent layer of metal, such as platinum, rhodium or iridium, by a well-known sputtering process performed in a high vacuum. This semitransparent layer of metal is thereafter engraved in such a manner as to remove only a portion of the thickness of the material so disposed on the member 78 and thereby form the individual calibrations, numbers and the like forming the graduated scale.

A scale so formed is indicated in Fig. 5 by numeral 88 and this scale is provided with a zero or base reference mark 90, and positive and negative values upon the scale at opposite sides thereof. The plates 78 so formed with the scale 88 of such size as to correspond with the amount of taper of the wedge member 76 is thereafter placed upon the wedge shaped plate 76 with a layer 92 of adhesive, such as Canada balsam, between said members. The members are then longitudinally shifted relative to one another, while under observation in suitable optical equipment provided for the purpose, until the zero or base reference mark 90 has reached the transverse plane through the wedge shaped member 76 having an equal thickness and is there held until the adhesive has hardened or set. At the plane of the mark 90 the total birefringence of the two superimposed members 76 and 78 will equal zero. In this manner the zero or base reference mark may be easily and exactly located at the plane of zero birefringence.

When such a retardation plate is employed in a polarizing microscope, light being reflected by a mirror 92 of a microscope through a polarizer 93 and suitable condensing lens system 94 and then passing through the slide 18 and the microscope objective 96 will strike the retardation plate 44 so that this plate and the scale 88, as well as the reticule 64 may be viewed through the eyepiece 40. Since the analyzer 66 is positioned between the reticule and the eyepiece birefringence in the specimen on the slide 18 may be observed and the the amount of birefringence may be measured on the scale 88 when the slide 32 is properly adjusted. The slide 32 will be in proper adjustment to indicate the amount of positive and negative birefringence of the specimen when it has been moved to a position showing a dark line or field traversing the slide and is in alignment with the cross hair 64a of the reticule 64.

From the foregoing it will be seen that we have provided simple, efficient and economical means and a process for obtaining all the objects and advantages of the invention.

Having described our invention, we claim:

1. A retardation plate of the character described comprising a first plate-like member formed of quartz, said member being relatively long and in the shape of a uniformly tapering thin wedge to provide substantially uniformly varying birefringent retardation properties throughout an elongated portion thereof, a second plate-like member formed of quartz, said second member being relatively long and thin and having plane parallel opposed surfaces to provide substantially uniform birefringent retardation properties throughout an elongated portion thereof, the parallel surfaces of said second member being spaced so as to provide a thickness therein equal to the thickness of a transverse plane intermediate the ends of the elongated portion of said wedge shaped member, said wedge shaped member and plane parallel member being so disposed in adjacent face-to-face relation relative to each other that their optical axes are at right angles, a graduated scale having a base reference mark associated therewith for indicating zero birefringence carried by said elongated portion of said plane parallel member with said base reference mark located intermediate the ends thereof, and means securing said members together with said base reference mark located directly opposite the said transverse plane of said wedge shaped member.

2. A retardation plate of the character described comprising a first elongated plate-like quartz member, a second elongated plate-like quartz member arranged in superimposed relation relative thereto, said first member being in the form of a relatively thin wedge to provide substantially uniformly varying birefringent retardation properties throughout the length thereof, said second member being relatively thin and having plane parallel opposed surfaces to provide substantially uniform birefringent retardation properties throughout the length thereof, the parallel surfaces of said second member being spaced so as to provide a thickness therein equal to the thickness of said first member at a transverse plane located intermediate the ends thereof so that the birefringent retardation properties of said second member are equal to the birefringent retardation properties of said first member at said transverse plane, said members being so arranged in adjacent relation that the optical axis of one member extends longitudinally and the optical axis of the other member extends transversely of said members, a coating material upon one of said parallel surfaces of said second member, a scale formed in said coating material intermediate the ends thereof and having a base reference mark associated therewith for indicating zero birefringence, and an adhesive for fixedly securing said members together with said base reference mark exactly located in said intermediate transverse plane of said first member.

3. The method of forming a birefringent retardation plate comprising forming on a first member of birefringent material an elongated relatively thin plate-like portion having opposed tapered surfaces for providing substantially uniformly varying birefringent properties therein, forming on a second member of birefringent material an elongated relatively thin plate-like portion having opposed plane parallel surfaces for providing substantially uniform birefringent properties therein, the plate-like portion of said second member being of such a thickness that the birefringent properties provided thereby will be equalled to the birefringent properties provided at a transverse plane intermediate the ends of the elongated plate-like portion of said first member, measuring the birefringence at two points on said first member located a predetermined longitudinal distance apart for determining the rate of change of birefringence therealong, forming a scale having a base reference mark for indicating zero birefringence on said second member intermediate the ends of the plate-like portion thereof with the spacing of the graduations of the scale determined by said rate of change in said first member, applying a cement to one of said members, placing said members together with said cement disposed therebetween and with the optical axes of said members positioned at right angles to each other, moving one of said members relative to the other so as to position said base reference mark in exact alignment with said transverse plane of said first member, and maintaining said members in such adjusted position until a set has occurred in the cement joining said members.

4. The method of forming a birefringent retardation plate comprising forming on a first member of birefringent material an elongated relatively thin plate-like portion having opposed tapered surfaces for providing substantially uniformly varying birefringent properties therein, forming on a second member of birefringent material an elongated relatively thin plate-like portion having opposed plane parallel surfaces for providing substantially uniform birefringent properties therein, the plate-like portion of said second member being formed of such a thickness that the birefringent properties provided thereby will be equal to the birefringent properties provided at a transverse plane intermediate the ends of the plate-like portion of said first member, measuring the birefringence at two points on said first member located a predetermined longitudinal distance apart for determining the rate of change of birefringence therealong, forming a layer of coating material on the plate-like portion of said second member, providing a scale having a base reference mark for indicating zero birefringence in said layer intermediate the ends thereof and with the spacings of the graduations of said scale determined by said rate of change in said first member, applying a cementing material to one of said members, placing said members together with the cementing material disposed therebetween and with the optical axes of said members positioned at right angles to each other, moving one of the members relative to the other so as to position said base reference mark in exact alignment with said transverse plane of said first member, and maintaining said members in such adjusted position until a set has occurred in the cementing material joining said members.

DAVID D. LOWBER.
JOSEPH D. REARDON.
PHILIP W. COLLYER.

REFERENCES CITED

The following references are of record in the file of this patent:

American Journal of Science (4th series), volume XXIX, Jan.–June 1910, New Haven, Conn. Article by Wright, pages 415–418. Copy in Scientific Library.

Johannsen: Manual of Petrographic Methods, 2nd edition, 1918, McGraw-Hill Book Co., Inc., 239 West 39th St., New York, N. Y., pages 366–368.